US009046421B2

(12) United States Patent
Land et al.

(10) Patent No.: US 9,046,421 B2
(45) Date of Patent: Jun. 2, 2015

(54) LIGHT SENSORS FOR ELECTRONIC DEVICES

(71) Applicant: Apple Inc., Cupertino, CA (US)

(72) Inventors: Brian R. Land, Woodside, CA (US); Steven P. Hotelling, San Jose, CA (US)

(73) Assignee: Apple Inc., Cupertino, CA (US)

(*) Notice: Subject to any disclaimer, the term of this patent is extended or adjusted under 35 U.S.C. 154(b) by 191 days.

(21) Appl. No.: 13/716,495

(22) Filed: Dec. 17, 2012

(65) Prior Publication Data

US 2014/0167619 A1 Jun. 19, 2014

(51) Int. Cl.
*G01J 1/44* (2006.01)
*G01J 1/02* (2006.01)

(52) U.S. Cl.
CPC . *G01J 1/44* (2013.01); *G01J 1/0271* (2013.01)

(58) Field of Classification Search
CPC ............. H05B 37/02; G09G 2360/144; G09G 3/3406; G01J 1/0233; G01J 1/0437; G01J 1/4204; G01J 1/0271; G01J 1/44
USPC .............. 315/149, 294, 297, 312; 349/58, 62, 349/110, 116; 348/374, 376; 345/158, 169, 345/173, 175, 102; 361/679.26; 250/214 AL, 208.2, 239
See application file for complete search history.

(56) References Cited

U.S. PATENT DOCUMENTS

| 7,835,001 | B2 * | 11/2010 | Kwack et al. ................. 356/399 |
| 8,031,174 | B2 * | 10/2011 | Hamblin et al. ............... 345/158 |
| 8,232,883 | B2 | 7/2012 | Yao et al. |
| 8,319,721 | B2 * | 11/2012 | Edwards et al. .............. 345/102 |
| 8,330,945 | B2 | 12/2012 | Choi et al. |
| 8,610,822 | B2 * | 12/2013 | Weber et al. ................... 348/374 |
| 2011/0128234 | A1 | 6/2011 | Lipman et al. |
| 2011/0248152 | A1 | 10/2011 | Svajda et al. |
| 2012/0170284 | A1 | 7/2012 | Shedletsky |
| 2014/0070081 | A1 * | 3/2014 | Spraggs et al. ............... 250/221 |

* cited by examiner

*Primary Examiner* — Haiss Philogene
(74) *Attorney, Agent, or Firm* — Treyz Law Group; Kendall P. Woodruff

(57) ABSTRACT

Electronic devices may include light sensors. A light sensor may be an ambient light sensor that is mounted adjacent to an aperture in an opaque structure. An ambient light sensor may include active light sensor elements located adjacent to the aperture and inactive light sensor elements located adjacent to the opaque structure. Signal processing circuitry may be interposed between the light sensor elements and a summing circuit that sums light signals from the light sensor elements to form an ambient light signal. The signal processing circuitry may include a switch and an amplifier associated with each light sensor element. The switch associated with each element may be used to selectively activate or inactivate that element. The amplifier associated with each element may be used to amplify the light signal from that element by a gain factor that depends on the location of that element with respect to the aperture.

20 Claims, 10 Drawing Sheets

LIGHT SENSORS FOR ELECTRONIC DEVICES

BACKGROUND

This relates generally to electronic devices, and more particularly, to electronic devices with light sensors.

Electronic devices often include light sensors. For example, cellular telephones often include an ambient light sensor that measures ambient light intensity in the vicinity of the device.

Ambient light sensors are often mounted within a device housing and receive light through a transparent aperture in the housing. It can be difficult to align the ambient light sensor with the aperture. In some situations, a misalignment with the aperture can lead to diminished signal strength for the ambient light sensor.

It would therefore be desirable to be able to provide improved light sensors for electronic devices.

SUMMARY

An electronic device may be provided with one or more light sensors. A light sensor may be an ambient light sensor, a proximity sensor, a camera, or other light sensor.

The electronic device may include a display. The display may have display layers for displaying images, a touch-sensitive layer for gathering user touch input, and a display cover layer such as an outer glass layer. The display and the light sensor may be mounted in a housing enclosure.

The light sensor may be mounted adjacent to a transparent or translucent aperture in the enclosure that allows light to pass through the aperture onto at least a portion of the light sensor.

The light sensor may include an array of light sensor elements. The light sensor elements may include active light sensor elements that are mounted adjacent to the aperture and inactive light sensor elements that are mounted adjacent to an opaque portion of the enclosure. Each light sensor element may be coupled to a switch that switchably activates or inactivates that light sensor element. Each light sensor element may be coupled to an amplifier that amplifies a light signal from that light sensor element. Each amplifier may amplify the signal from a given light sensor element using a gain factor that depends on the location of that light sensor element within the aperture.

Further features of the invention, its nature and various advantages will be more apparent from the accompanying drawings and the following detailed description of the preferred embodiments.

DETAILED DESCRIPTION

An electronic device may be provided with light sensors. A light sensor may be mounted adjacent to a transparent or translucent aperture in an opaque structure such as a housing structure for the device or a cover layer for a display.

The electronic device may include processing circuitry that gathers light sensor data using the light sensor and changes settings for the display based on the light sensor data. For example, ambient light sensor data may be used to determine that a light has been turned on or off in a room containing the device or that the device has been moved into bright sunlight. The processing circuitry may increase or decrease the brightness of the display based on detected decreases or increases in ambient light.

The electronic device may include an enclosure formed from one or more housing structures and, if desired, the display cover layer. The display cover layer may be a transparent cover layer such as a glass layer or transparent plastic layer for the display that allows active display pixels in the display to be viewed through the cover layer. Portions of the transparent cover layer may be covered by an opaque masking layer such as a black ink layer that prevents internal components from being viewed by a user of the device.

Light sensors may be mounted against a portion of the enclosure. The enclosure may include a transparent or translucent aperture that allows at least some light to pass through the enclosure to and/or from the light sensor. For example, the light sensor may be mounted against the display cover layer in an opaque region that is covered by the opaque masking layer. The opaque region of the display cover layer may include an opening such as a circular opening in the masking layer that forms the aperture.

Light sensor performance may depend on the accuracy of the alignment of the light sensor with the aperture. The light sensor may therefore include light sensor elements formed on a substrate that cover a region of the substrate having a lateral size that is larger than the lateral size of the aperture. The light sensor may be formed with active light sensor elements that receive light through the aperture and additional inactive light sensor elements that are prevented from receiving light by the device enclosure.

During manufacturing of the device, light may be transmitted through the aperture onto the light sensor. Light sensor elements that receive light through the aperture during the test may be configured as active light sensor elements. Light sensor elements that do not receive light through the aperture during the test may be inactivated. In this way, the device may be provided with active light sensor elements that substantially fill the aperture, thereby reducing the risk of ambient light signal loss due to misaligned light sensors.

Figure 1:
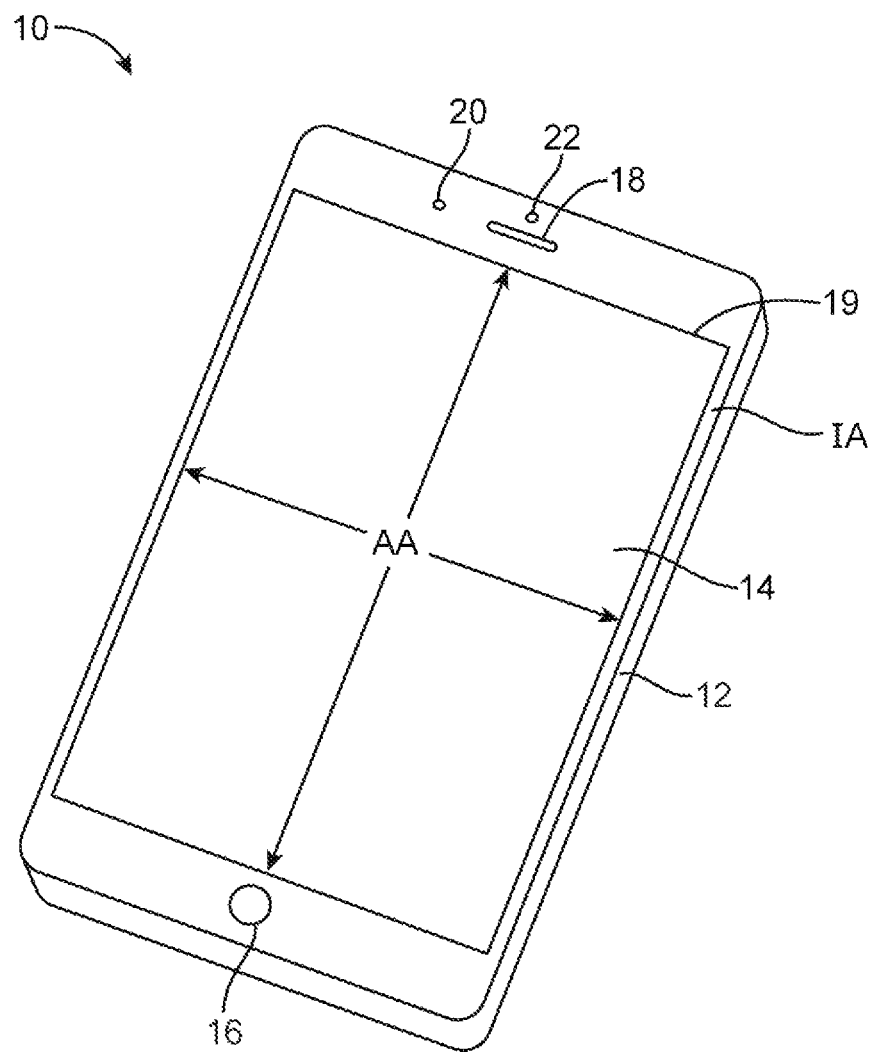
FIG. 1 is a perspective view of an illustrative electronic device such as a handheld electronic device with a light sensor in accordance with an embodiment of the present invention.

An illustrative electronic device that may be provided with one or more light sensors is shown in FIG. 1. FIG. 1 shows how electronic device 10 may be a handheld device such as a cellular telephone, music player, gaming device, navigation unit, or other compact device. In this type of configuration for device 10, device 10 may include housing 12 having opposing front and rear surfaces and a peripheral edge portion (sometimes referred to as a band). The front surface of housing 12 may be formed from a cover layer for a display such as display 14.

Display 14 may be a liquid crystal display, an organic light-emitting diode (OLED) display, or other suitable display. Display 14 may include display pixels formed from light-emitting diodes (LEDs), organic light-emitting diodes (OLEDs), plasma cells, electronic ink elements, liquid crystal display (LCD) components, and/or other suitable display pixel structures. Display 14 may, if desired, include capacitive touch sensor electrodes for a capacitive touch sensor array or other touch sensor structures (i.e., display 14 may be a touch screen).

Display 14 may be mounted on a front face of housing 12. Display 14 may, if desired, have a display cover layer such as a glass layer, plastic layer, or other exterior layer that forms a portion of an enclosure for device 10. An outer display cover layer may include openings for components such as button 16 and for speaker port 18.

Display 14 may be characterized by an active region such as rectangular active region AA and an inactive region such as peripheral inactive region IA. Rectangular active region AA may be bounded by rectangular border 19. Inactive region IA may have the shape of a rectangular ring that surrounds the periphery of active region AA. If desired, some of the edges of display 14 may be borderless (i.e., the width of the inactive region on one or more edges may be zero or may be negligibly small). The illustrative configuration of FIG. 1 in which display 14 is surrounded by an inactive border region is merely illustrative.

The underside of a display cover layer (i.e., that surface of the cover layer that is interior to the device) in inactive area IA may be provided with an opaque masking layer such as a layer of black ink to help hide internal components such as antennas, speakers, etc. from view by a user of device 10. If desired, openings may be provided in the opaque masking layer to allow light to reach light-sensitive components such as camera 20 or light sensor 22 (e.g., a proximity sensor or an ambient light sensor) through the cover layer for display 14.

Device 10 may have a housing enclosure formed at least in part by housing structures such as housing structure 12. Electronic components such as light sensor 22 and camera 20 may be mounted within housing structure 12. Housing structure 12, which is sometimes referred to as a case or enclosure, may be formed of materials such as plastic, glass, ceramics, carbon-fiber composites and other composites, metal, aluminum, other materials, or a combination of these materials. Device 10 may be formed using a unibody construction in which most or all of housing structure 12 is formed from a single structural element (e.g., a piece of machined metal or a piece of molded plastic) or may be formed from multiple housing structures (e.g., outer housing structures such as glass or plastic portions that have been mounted to internal frame elements or external housing members such as a peripheral band that runs around an edge of device 10).

Touch-sensor components such as an array of capacitive touch-sensor electrodes formed from transparent materials such as indium tin oxide may be formed on the underside of a display cover layer, may be formed on a separate display layer such as a glass or polymer touch-sensor substrate, or may be integrated into other display layers (e.g., substrate layers such as a thin-film transistor layer).

The configuration for device 10 shown in FIG. 1 is merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Figure 2:
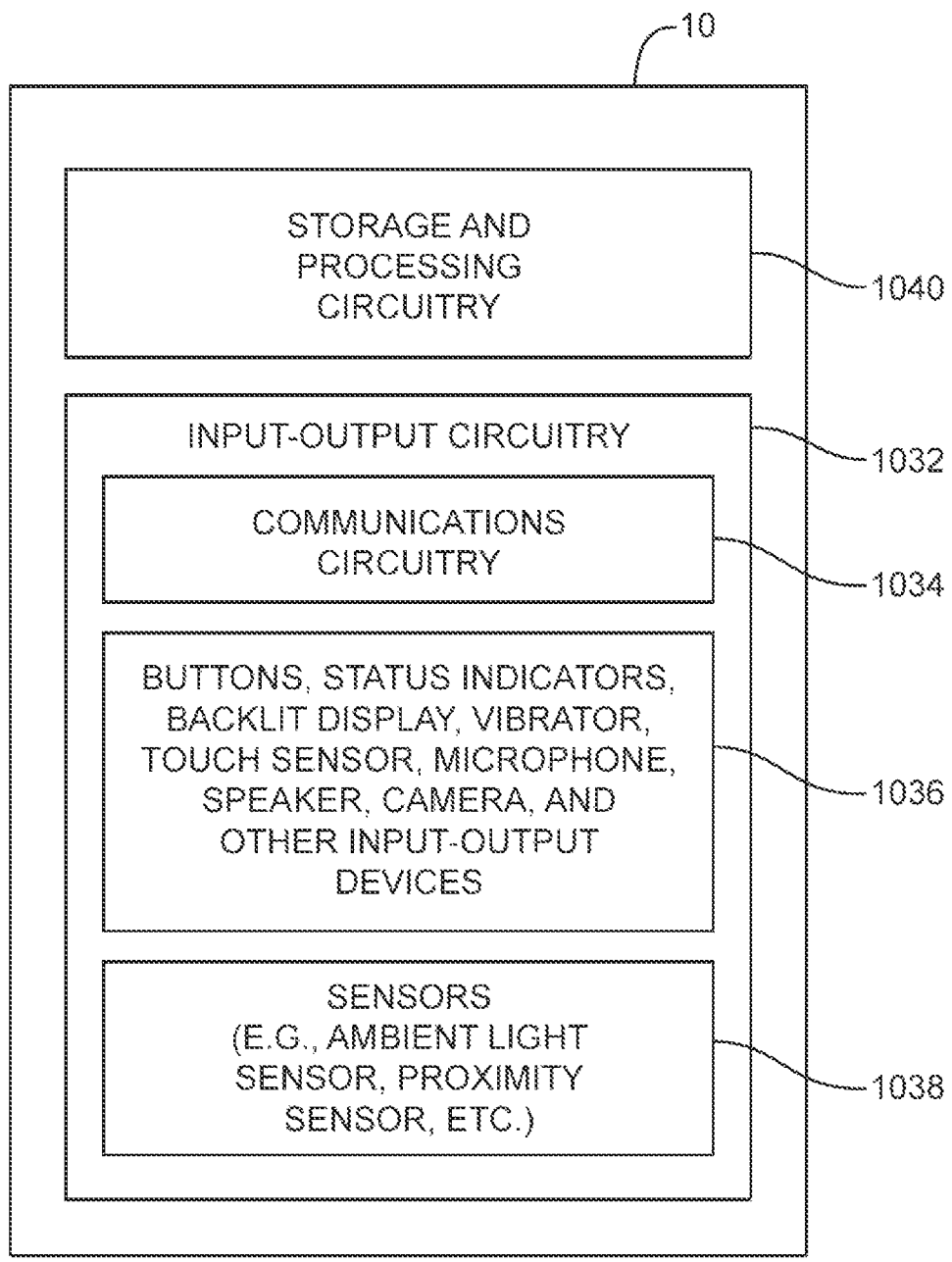
FIG. 2 a schematic diagram of an illustrative electronic device of the type that may be provided with a light sensor in accordance with an embodiment of the present invention.

A schematic diagram of device 10 is shown in FIG. 2. As shown in FIG. 2, electronic device 10 may include control circuitry such as storage and processing circuitry 1040. Storage and processing circuitry 1040 may include one or more different types of storage such as hard disk drive storage, nonvolatile memory (e.g., flash memory or other electrically-programmable-read-only memory), volatile memory (e.g., static or dynamic random-access-memory), etc. Processing circuitry in storage and processing circuitry 1040 may be used in controlling the operation of device 10. The processing circuitry may be based on a processor such as a microprocessor and other integrated circuits.

With one suitable arrangement, storage and processing circuitry 1040 is used to run software on device 10 such as internet browsing applications, email applications, media playback applications, operating system functions, software for capturing and processing images, software for implementing functions associated with gathering and processing sensor data, etc.

Input-output circuitry 1032 may be used to allow data to be supplied to device 10 and to allow data to be provided from device 10 to external devices.

Input-output circuitry 1032 can include wired and wireless communications circuitry 1034. Communications circuitry 1034 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications).

Input-output circuitry 1032 of FIG. 2 may include input-output devices 1036 such as buttons, joysticks, click wheels, scrolling wheels, a touch screen such as display 14, other touch sensors such as track pads or touch-sensor-based buttons, vibrators, audio components such as microphones and speakers, image capture devices such as a camera module having an image sensor and a corresponding lens system, keyboards, status-indicator lights, tone generators, key pads, and other equipment for gathering input from a user or other external source and/or generating output for a user.

Sensors 1038 of FIG. 2 may include a light sensor such as light sensor 22 (e.g., an ambient light sensor or a proximity sensor). Ambient light sensors may include one or more semiconductor detectors (e.g., silicon-based detectors) or other light detection circuitry. Proximity sensor components may include a dedicated proximity sensor and/or a proximity sensor formed from touch sensors (e.g., a portion of the capacitive touch sensor electrodes in a touch sensor array for display 14 that are otherwise used in gathering touch input for device 10). Proximity sensor components in device 10 can include capacitive proximity sensor components, infrared-light-based proximity sensor components, proximity sensor components based on acoustic signaling schemes, or other proximity sensor equipment. Sensors 1038 may also include a pressure sensor, a temperature sensor, an accelerometer, a gyroscope, and other circuitry for making measurements of the environment surrounding device 10.

Storage and processing circuitry 1040 may receive ambient light signals from one or more of sensors 1038 and may adjust the brightness of a display such as display 14 based on the received ambient light data.

Figure 3:
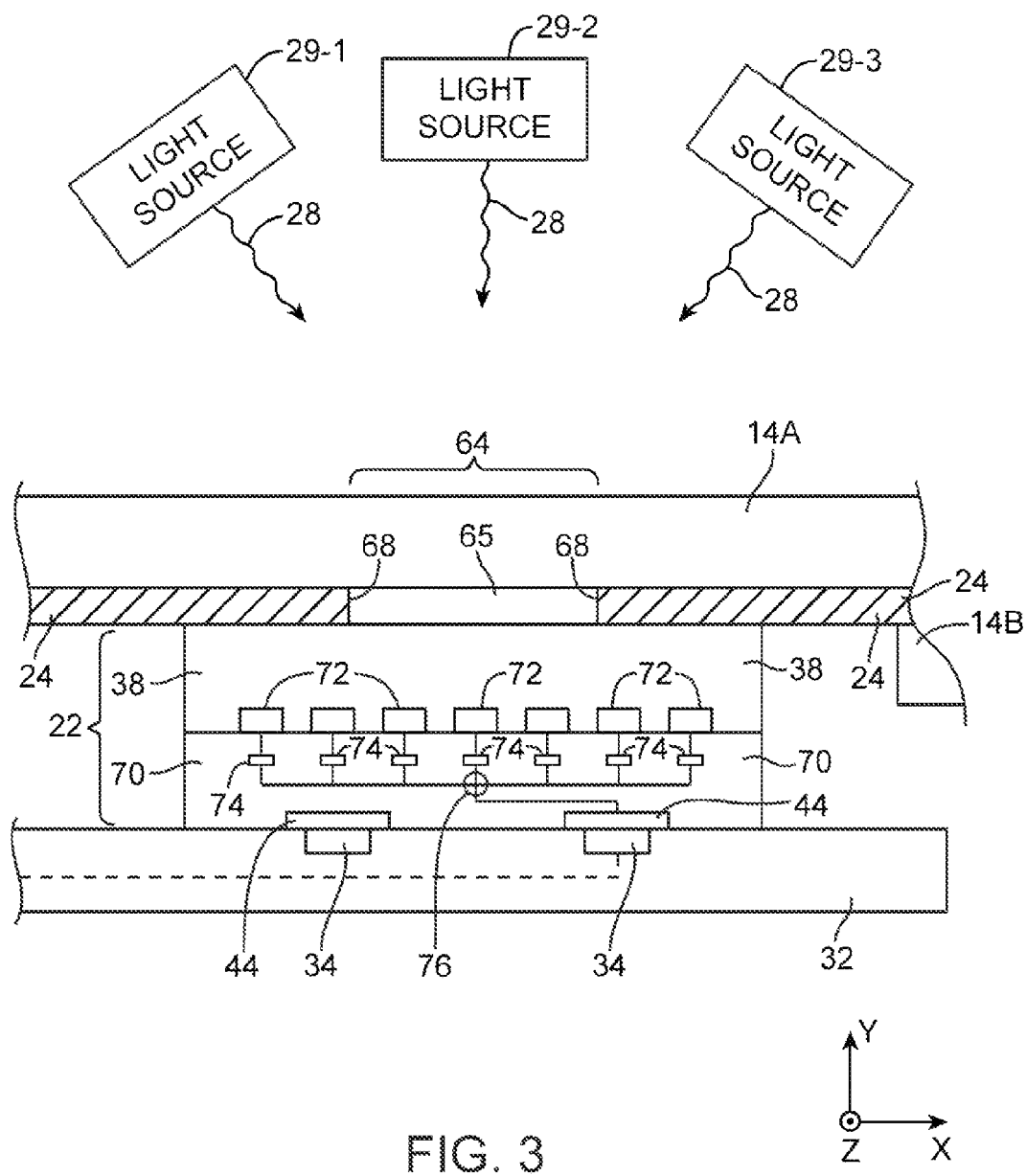
FIG. 3 is a diagram of an illustrative portion of an electronic device in the vicinity of a light sensor mounted adjacent to an aperture in accordance with an embodiment of the present invention.

A cross-sectional side view of an illustrative configuration that may be used for light sensor 22 of device 10 is shown in FIG. 3. As shown in FIG. 3, light sensor 22 may be implemented as an ambient sensor that that is mounted against a cover layer such as glass layer 14A of display 14. Aperture 64 may be a transparent or translucent aperture in layer 14A that allows some or all of the light from outside of device 10 that falls on the aperture to pass through aperture 64 onto sensor 22. However, this is merely illustrative. If desired, aperture 64 may be formed from an opening in a device housing structure such as housing structure 12 of FIG. 1.

Aperture 64 may block a portion of the light that falls on the aperture while allowing a portion of the light to pass through. In this way, an aperture may be provided that appears dark to a user of device 10 while allowing sufficient light to reach sensor 22 to allow measurements of the ambient light conditions surrounding device 10 in a wide range of ambient light conditions. Aperture 64 may also have light scattering or other light distorting characteristics. However, at least a portion of the light that falls on aperture 64 is transmitted through aperture 64 onto sensor 22.

The portion of light that passes through aperture 64 may be 100 percent, less than 100 percent, less the 50 percent, less than 10 percent, less than 2 percent, between 1 percent and 10 percent, more than 0.2 percent, between 0.2 percent and 50 percent, more than 0.02 percent, or between 10 and 100 percent of the light that falls on the aperture (as examples).

Display 14 may also include display layers 14B for generating images to be displayed on display 14. Display layers 14B may include polarizer layers, color filter layers, transistor layers, adhesive layers, layers of liquid crystal material, other layers for generating display images, and/or one or more layers of touch-sensitive components such as an array of capacitive touch-sensor electrodes formed from transparent materials such as indium tin oxide.

An opaque masking layer such as black mask 24 may be formed on an inner surface of glass layer 14. Aperture 64 for light sensor 22 may be formed from an opening such as hole 65 in opaque masking layer 24.

Aperture 64 may be a circular aperture, a rectilinear aperture, or an aperture having any suitable shape (e.g., edge 68 of aperture 64 may have shape that defines a circle, a rectangle, a square, or any other suitable shape). As shown in FIG. 3, light sensor 22 may receive light 28 from sources such as light sources 29 (e.g., light sources 29-1, 29-2, and 29-3 of FIG. 3) that illuminate device 10 from various angles of incidence through aperture 64.

Light sensor 22 may include a light processing layer 38 formed on a substrate such as substrate 70 (e.g., a silicon substrate). Light sensor elements 72 of light processing layer 38 may be formed on substrate 70 (e.g., on a surface of substrate 70 or embedded or partially embedded in substrate 70). Light sensor elements may be light-sensitive components such as photodiodes or other photo-sensitive elements that convert incident light into electrical signals. Light sensor elements 72 may be coupled to other circuitry on substrate 70. For example, each light sensor element 72 may be coupled to a summing circuit such as summing circuit 76 that sums light signals from multiple elements 72 to form an ambient light signal.

Signal processing circuitry 74 associated with each light sensor element 72 may be coupled between that light sensor element 72 and summing circuit 76. Signal processing circuitry 74 may include one or more switches, one or more amplifiers, one or more resistors, one or more charge storage regions, one or more capacitors, analog-to-digital conversion circuitry, or other circuit elements for processing electrical signals for light sensor elements 72. Signal processing circuitry 74 may include analog circuit elements and/or digital processing circuits that process signals from light sensor elements 72 that have been converted to digital light signals.

In the example of FIG. 3, signal processing circuitry 74 and summing circuit 76 are stacked vertically (e.g., spaced along the y-direction of FIG. 2). However, this is merely illustrative. If desired, light sensor elements 72, signal processing circuitry 74, summing circuit 76 and other circuitry for light sensor 22 may be formed on a surface of substrate 70. Substrate 70 may include one or more vertical conductive structures such as conductive vias through substrate 70 that couple summing circuit 76 and other circuitry on substrate 70 to electrical contacts 44.

Light sensor 22 may include electrical contacts 44 on a bottom surface of substrate 70 that are coupled to associated electrical contacts 34 on a printed circuit such as flexible printed circuit 32. Flexible printed circuit 32 may be used to route signals to and from light sensor 22 to processing circuitry for device 10 such as storage and processing circuitry 1040 of FIG. 2. Light signals generated by light sensor elements 72 may be processed using circuitry 74, summed using summing circuit 76 and provided to additional circuitry such as storage and processing circuitry 1040 using flexible printed circuit 32.

As shown in FIG. 3, some of light sensor elements 72 may be formed behind aperture 64 so that light 28 is able to reach those light sensor elements. Other light sensor elements 72 may be formed behind a portion of opaque masking layer 24 so that light 28 is prevented from reaching those light sensor elements. In this way, light sensor 22 may be provided with a distribution of light sensor elements (e.g., an array of light sensor elements) that is partially formed behind aperture 64 and that extends beyond edges 68 of aperture 64.

Light sensor elements 72 that are located adjacent to aperture 64 (and that receive light such as light 28 through aperture 64) may be active light sensor elements that generate a light signal. Light sensor elements 72 that are located adjacent to masking layer 24 (and that are prevented from being illuminated by light such as light 28) may be inactive light sensor elements. Active light sensor elements 72 may be coupled to summing circuit 76 using a closed (enabled) switch associated with signal processing circuitry 74 for that light sensor element. Inactive light sensor elements 72 may be inactivated a disabled (open) switch associated with signal processing circuitry 74 for that light sensor element. In this way, light sensor 22 may be provided with active light sensor elements that receive light through aperture 64 and inactive light sensor elements that are prevented from receiving light though aperture 64.

Each light sensor element 72 may be coupled to a dedicated signal amplifier (e.g., an analog amplifier or a digital signal amplifier). Light 28 that is incident on light sensor elements 72 may generate a corresponding light signal. That light signal may be multiplied by a gain factor using the dedicated amplifier.

Light signals generated by active light sensor elements 72 under aperture 64 may be amplified and summed to provide an ambient light signal for device 10. Because light sources such as light sources 29-1, 29-2, and 29-3 may be oriented at various angles with respect to aperture 64, the amount of light 28 from each light source that enters aperture 64 may be different even if the amount of light generated by each light source is the same.

Figure 4:
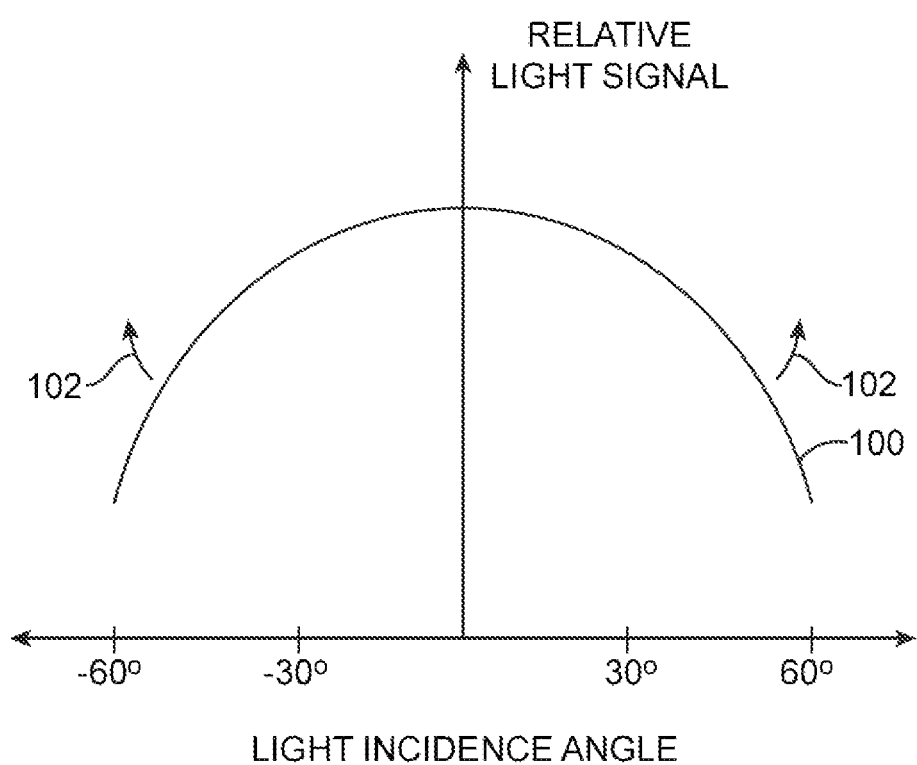
FIG. 4 is a graph of light sensitivity versus incidence angle for an illustrative light sensor showing how the sensitivity at relatively large incidence angles may be increased using a light sensor with light sensor elements having individual gains in accordance with an embodiment of the present invention.

FIG. 4 is a graph showing how the relative light signal generated by a light sensor in response to light from a light source may depend on the light incidence angle at which the light is received from that light source. As shown by curve 100, the relative light signal generated by the light source may decrease as the angle of incidence of the light with respect to aperture 64 increases.

The effective size of an aperture such as aperture 64 can therefore be reduced when a device is tipped with respect to a light source. If care is not taken, a light sensor may therefore generate erroneously changing ambient light signals due to changes in orientation of the light sensor.

In order to reduce the effects of decreased ambient light signals from light sources at increased incidence angles, light signals from light sensor elements 72 of light sensor 22 that are located relatively closer to the edge of aperture 64 may be multiplied by a gain factor that is higher than a gain factor that is applied to light signals from light sensor elements 72 that are located relatively closer to the center of aperture 64. In this way, the relative light signal generated by light sensor 22 from light at large incidence angles may be increased as indicated by arrows 102, thereby reducing the dependence of the ambient light signal on the orientation of device 10. Light-sensor-specific gain factors may be applied to light signals from each light sensor element 72 using signal processing circuitry 74 associated with that light sensor element.

Figure 5:
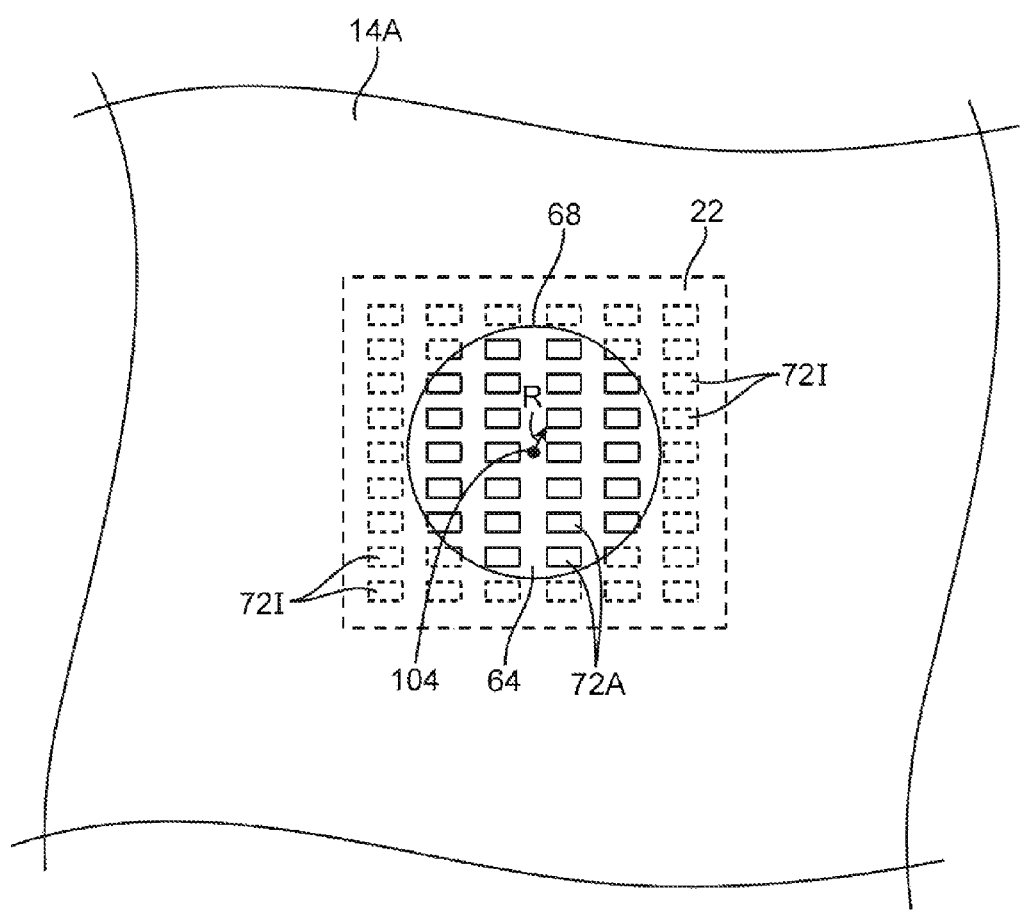
FIG. 5 is a top view of a portion of an illustrative cover layer for a device display showing how a light sensor may be mounted behind an aperture on the cover layer in accordance with an embodiment of the present invention.

FIG. 5 is a top view of display cover layer 14A showing how light sensor 22 may have a lateral size that is larger than the lateral size (e.g., the diameter) of aperture 64. As shown in FIG. 4, light sensor elements 72 that are formed under aperture 64 may be active light sensor elements 72A and light sensor elements 72 that are formed on a portion of light sensor 22 that extends beyond aperture 64 may be inactive light sensor elements 72I.

Each active light sensor element 72A may be located at a distance R from the center point 104 (or effective center point 104) of aperture 64. Light signals generated by a light sensor element 72 located at a distance R from center point 104 may be amplified (using signal processing circuitry 74) by a gain factor G(R) that depends on that distance R. For example, the gain factor G(R) may increase proportionally to R. However, this is merely illustrative. If desired, gain factor G(R) may have another dependence on distance R or may otherwise depend on the location of a given light sensor element on light sensor 22 and/or within aperture 64.

Light sensor elements 72 of light sensor 22 may be inactivated or activated and may be amplified using a gain factor such as G(R) using signal processing circuitry 74. Signal processing circuitry 74 may include digital or analog switches, digital or analog amplifiers, and/or other circuitry for processing light signals from light sensor elements 72.

Figure 6:
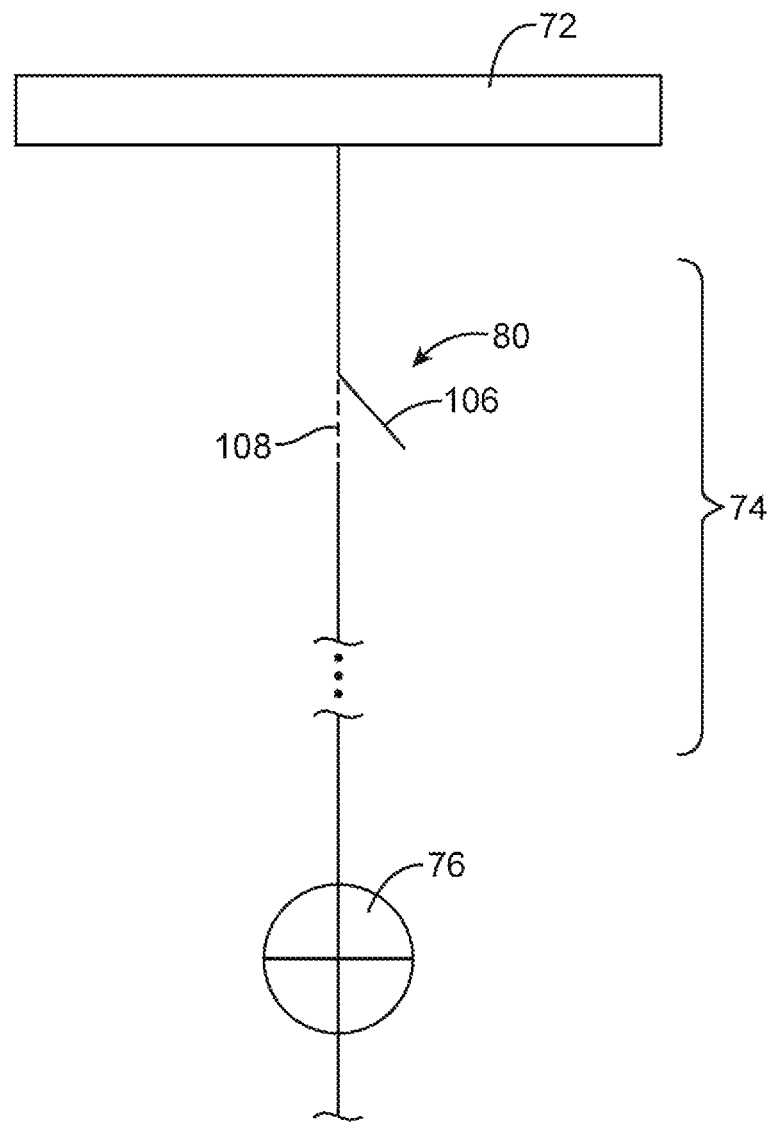
FIG. 6 is a diagram of an illustrative light sensor element having a dedicated switch in accordance with an embodiment of the present invention.

As shown in FIG. 6, a switch such as switch 80 may be interposed between a given light sensor element 72 and summing circuit 76. Switch 80 may be an analog switch or a digital switch. Switch 80 may be connected to light sensor element 72 in open (enabled) configuration 106 or closed (disabled) configuration 108. A light sensor element 72 having a switch 80 in open configuration 106 interposed between that light sensor element and summing circuitry 76 may be an inactive light sensor element. A light sensor element 72 having a switch 80 in closed configuration 108 interposed between that light sensor element and summing circuitry 76 may be an active light sensor element. The state (i.e., enabled or disabled) may be set during manufacturing and assembly operations for device 10. Signal processing circuitry 74 may, if desired, include other signal processing circuitry in addition to switch 80.

Figure 7:
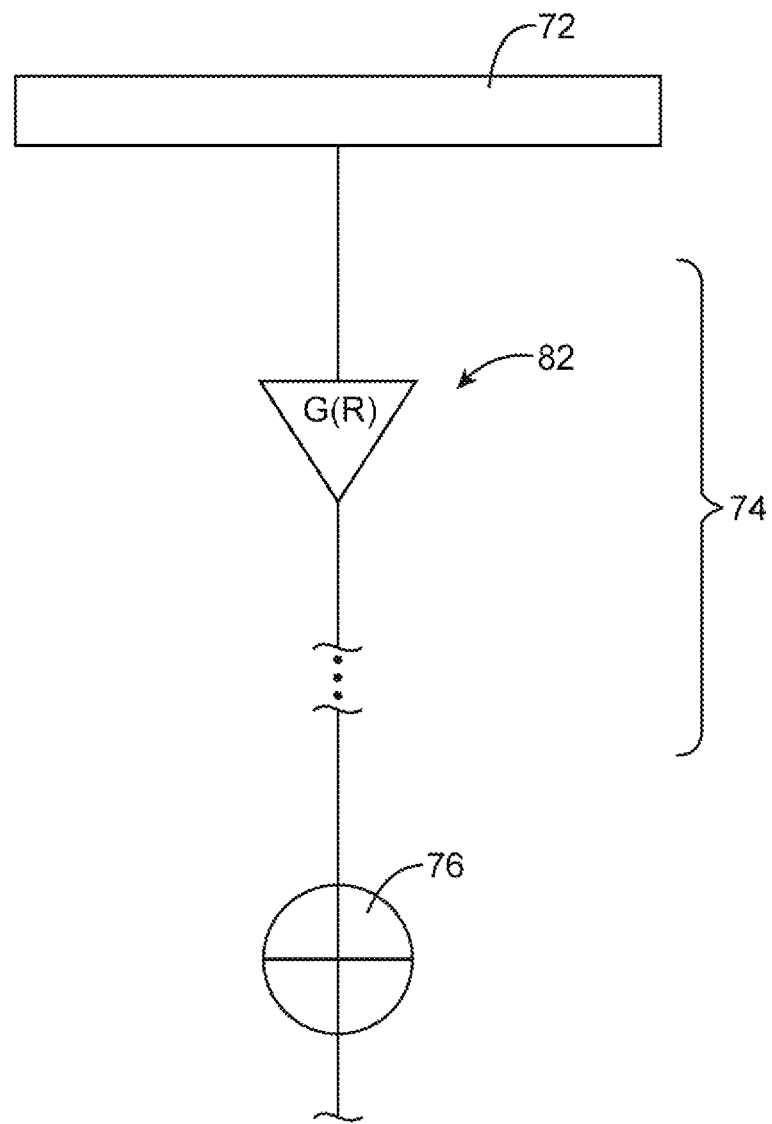
FIG. 7 is a diagram of an illustrative light sensor element having a dedicated amplifier in accordance with an embodiment of the present invention.

As shown in FIG. 7, an amplifier such as amplifier 82 may be interposed between a given light sensor element 72 and summing circuit 76. Amplifier 82 may be an analog amplifier or a digital amplifier. Amplifier 82 may receive a light signal from light sensor element 72 and amplify that light signal by a gain factor G(R) that depends on the position of the light sensor element with respect to, for example, the center of aperture 64. Signal processing circuitry 74 may, if desired, include other signal processing circuitry in addition to amplifier 82.

Figure 8:
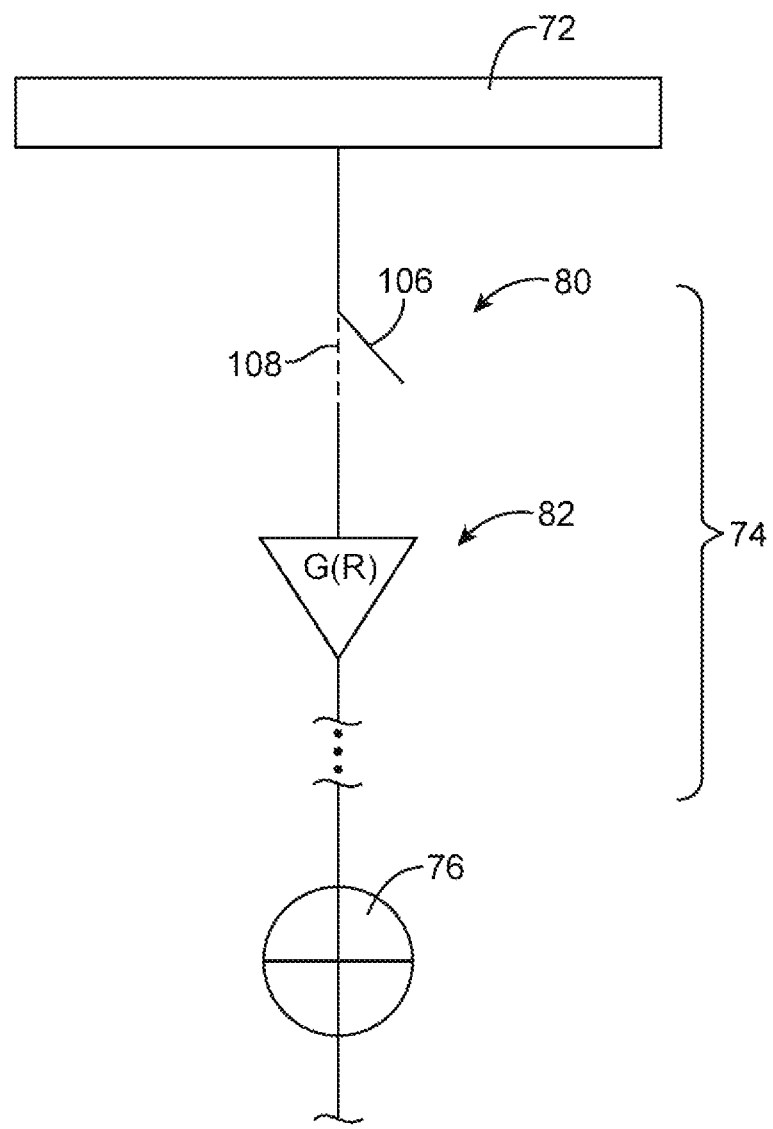
FIG. 8 is a diagram of an illustrative light sensor element having a dedicated switch and a dedicated amplifier in accordance with an embodiment of the present invention.

As shown in FIG. 8, signal processing circuitry 74 may include a switch such as switch 80 and an amplifier such as amplifier 82 interposed between a given light sensor element 72 and summing circuit 76. In this type of configuration, when switch 80 is in open configuration 106, light sensor element 72 may be an inactive light sensor element. When switch 80 is in closed configuration 108, light sensor element 72 may be an active light sensor element that generates a light signal that is received by amplifier 82 and amplified by a gain factor G(R) that depends on the position of the light sensor element with respect to aperture 64. Signal processing circuitry 74 may, if desired, include other signal processing circuitry in addition to switch 80 and amplifier 82.

Figure 9:
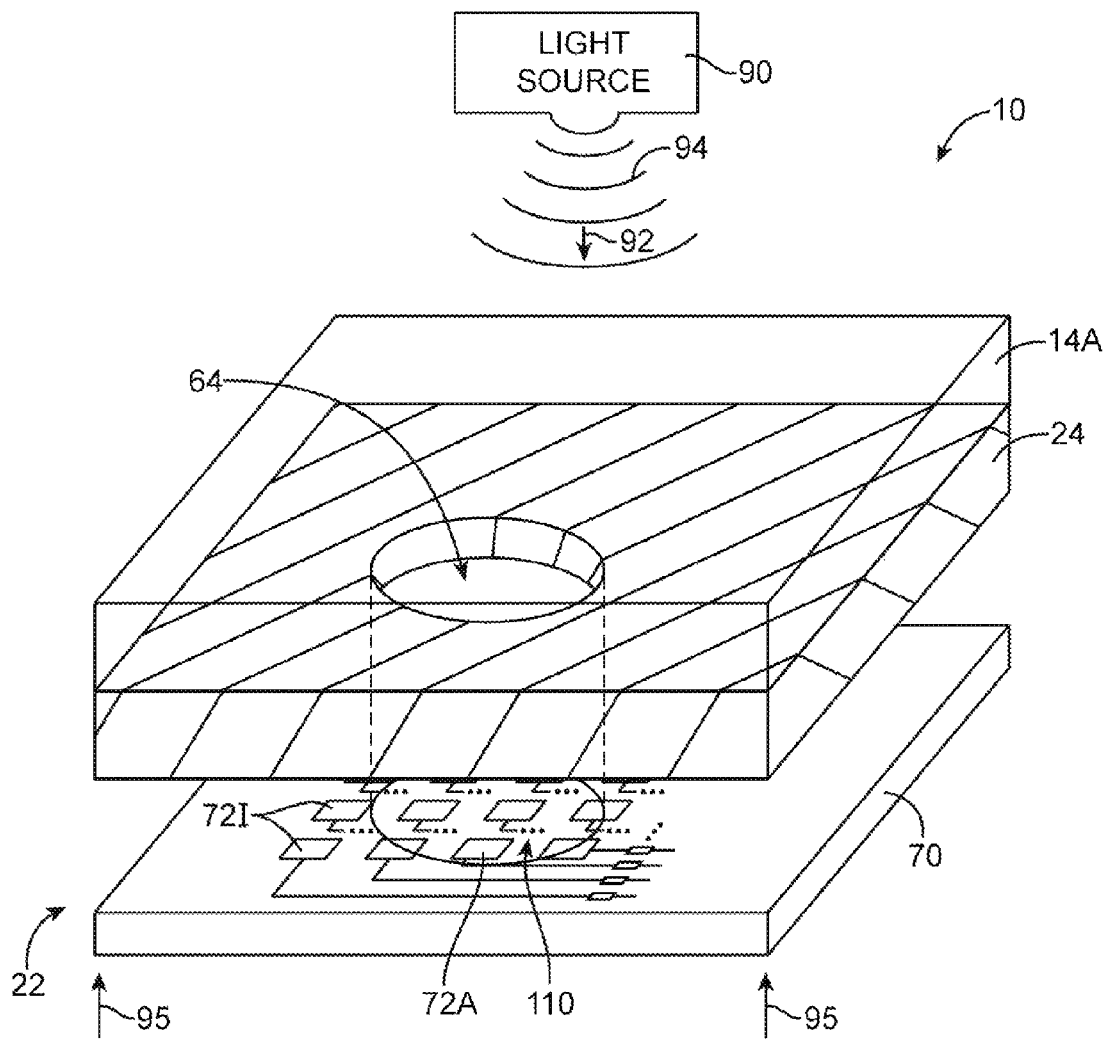
FIG. 9 is a perspective view of an illustrative light sensor showing how the light sensor may have an array of light sensor elements that extends beyond an aperture in a device enclosure in accordance with an embodiment of the present invention.

FIG. 9 is a perspective view of a portion of device 10 in the vicinity of aperture 64 and light sensor 22 during manufacturing and assembly operations for device 10. As shown in FIG. 9, light sensor 22 may be mounted adjacent to aperture 64 by moving light sensor 22 in direction 95 against cover layer 14A and masking layer 24. Light sensor 22 may be attached to cover layer 14A behind aperture 64 using adhesive such as pressure sensitive adhesive or curable liquid adhesive or using mechanical attachment members such as screws or clips.

During manufacturing and assembly operations, an external light source such as light source 90 may be used to emit light 94 in direction 92 to illuminate light sensor 22 through aperture 64 while all switches 80 (FIGS. 6 and 8) associated with all light sensor elements 72 are enabled (closed). Light sensor elements 72 that are illuminated by light 94 (e.g., light sensor elements located partially or completely in illumination area 110 under aperture 64) may generate a light signal. Light sensor elements 72 that are prevented from being illuminated by light 94 (i.e., light sensor elements located outside of illumination area 110) may generate a negligible light signal or no light signal in response to the light from the external light source.

Switches 80 that are connected to light sensor elements 72 that generate a light signal in response to light 94 may be permanently enabled (closed), thereby forming active light sensor elements 72A behind aperture 64. Switches 80 that are connected to light sensor elements 72 that generate a negligible light signal or no light signal in response to light 94 may be permanently disabled (opened), thereby forming inactive light sensor elements 72I in a region of light sensor 22 that extends beyond aperture 64. In this way, light sensor 22 may be provided with active light sensor elements 72A that receive light through aperture 64 and inactive light sensor elements 72I that are prevented from receiving light by an opaque structure such as opaque masking layer 24.

Figure 10:
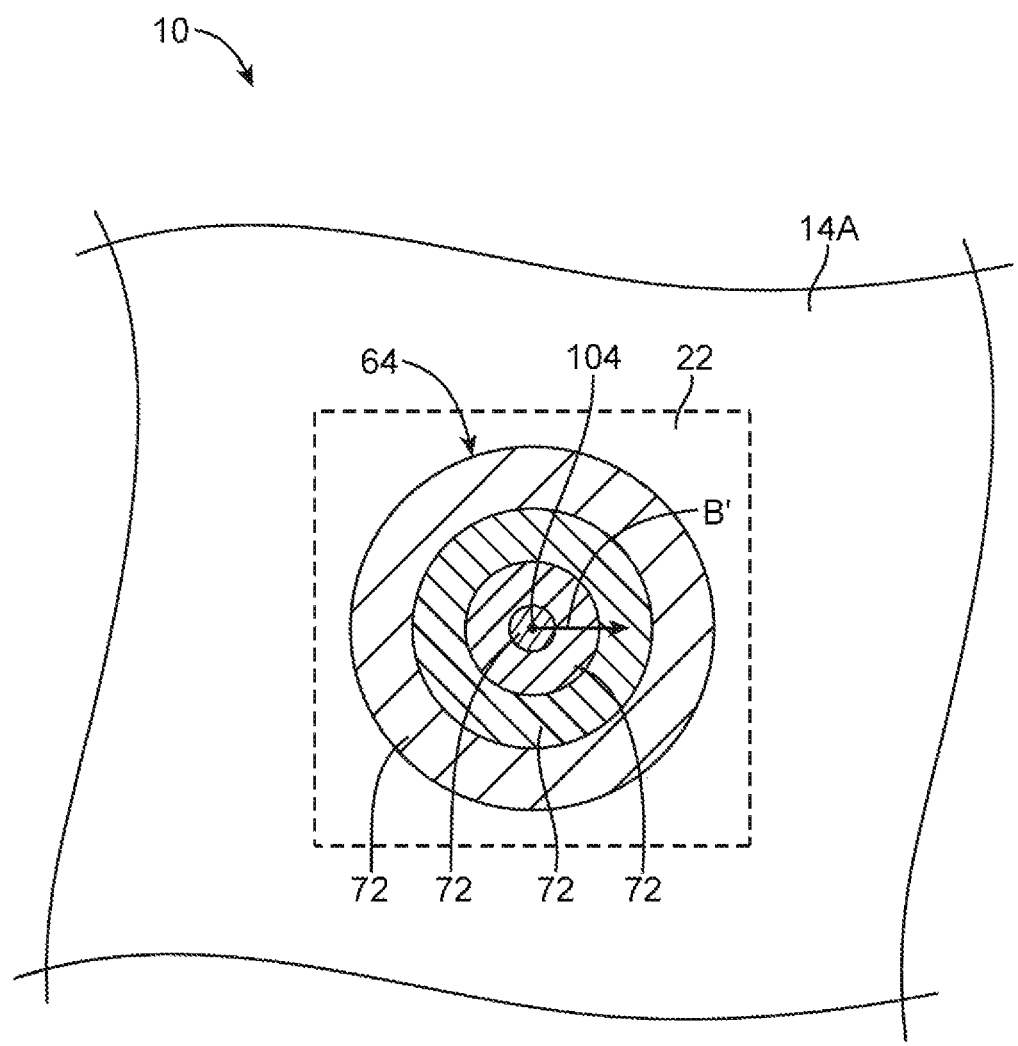
FIG. 10 is a top view of an illustrative light sensor having light sensor elements with concentric circular shapes in accordance with an embodiment of the present invention.

The examples described above in which light sensor 22 includes an array of light sensor elements 72 that are distributed in an array on substrate 70 are merely illustrative. If desired, light sensor elements 72 may have other shapes and/or may be otherwise arranged on substrate 70. FIG. 10 is a top view of display cover layer 14A in the vicinity of aperture 64 and light sensor 22 showing how light sensor elements 72 may have a circular shape that corresponds to a circular shape for aperture 64. Light gathering portions of light sensor elements 72 may substantially fill the portion of light sensor 22 that is adjacent to aperture 64. The circular light sensor elements of FIG. 10 may be concentric circular light sensor elements that extend around a center point that is aligned with center point 104 of aperture 64.

In a configuration of the type shown in FIG. 10 in which light sensor elements 72 are concentric circular light sensor elements, each light sensor element may have a characteristic radius such as radius R' (e.g., a central portion of each concentric circular light sensor element may be located on substrate 70 at a distance R' from center 104). If desired, each concentric circular light sensor element may be coupled to an amplifier 80 that amplifies light signals from that light sensor element using a gain factor G(R') that depends on the effective radius R' of that light sensor element. For example, the gain factor G(R') may increase proportionally to R'. However, this is merely illustrative. If desired, gain factor G(R') may have another dependence on radii R'.

The foregoing is merely illustrative of the principles of this invention and various modifications can be made by those skilled in the art without departing from the scope and spirit of the invention.

What is claimed is:

1. An electronic device, comprising:
    an enclosure having at least one opaque portion;
    an aperture in the opaque portion; and
    a light sensor mounted to the enclosure, wherein the light sensor includes a first portion that receives light through the aperture, a second portion that is prevented from receiving light by the opaque portion, active light sensor elements in the first portion, and inactive light sensor elements in the second portion.

2. The electronic device defined in claim 1, further comprising:
    signal processing circuitry; and
    a summing circuit, wherein the signal processing circuitry comprises circuitry that is interposed between each active light sensor element and the summing circuit and additional circuitry that is interposed between each inactive light sensor element and the summing circuit.

3. The electronic device defined in claim 2 wherein the circuitry that is interposed between each active light sensor element and the summing circuit comprises a plurality of enabled switches, wherein each of the enabled switches is coupled between a selected one of the active light sensor elements and the summing circuit.

4. The electronic device defined in claim 3 wherein the additional circuitry that is interposed between each inactive light sensor element and the summing circuit comprises a plurality of disabled switches, wherein each of the disabled switches is coupled between a selected one of the inactive light sensor elements and the summing circuit.

5. The electronic device defined in claim 1 wherein the aperture has a lateral size and wherein the light sensor comprises a substrate having a lateral size that is larger than the lateral size of the aperture.

6. The electronic device defined in claim 5 wherein the second portion of the light sensor that is prevented from receiving light by the opaque portion comprises a portion of the substrate that extends beyond an edge of the aperture.

7. The electronic device defined in claim 1 wherein the enclosure comprises an opaque housing structure and wherein the aperture comprises an opening in the opaque housing structure.

8. The electronic device defined in claim 1, further comprising a display, wherein the enclosure comprises a cover layer for the display.

9. The electronic device defined in claim 8 wherein the cover layer comprises a transparent material and wherein the opaque portion of the enclosure comprises a portion of the transparent material that is covered by an opaque masking layer.

10. An electronic device, comprising:
    an enclosure having at least one opaque portion;
    an aperture in the opaque portion that allows at least some light to pass through the aperture; and
    a light sensor mounted adjacent to the aperture in the opaque portion, wherein the light sensor comprises a plurality of light sensor elements and a plurality of corresponding amplifiers, wherein each amplifier is coupled to a selected one of the plurality of light sensor elements, wherein each amplifier amplifies light signals from the selected one of the light sensor elements using a gain factor for that light sensor element, and wherein the gain factor for each light sensor element is based on a location of that light sensor element on the light sensor.

11. The electronic device defined in claim 10, further comprising a summing circuit coupled to each of the plurality of corresponding amplifiers.

12. The electronic device defined in claim 11 wherein the aperture has a center and wherein the gain factor for each light sensor element is proportional to a distance between the location of that light sensor element and the center of the aperture.

13. The electronic device defined in claim 10 wherein the light sensor further comprises at least one inactive light sensor element.

14. The electronic device defined in claim 10 wherein the plurality of light sensor elements comprise a plurality of concentric circular light sensor elements each having an effective radius and wherein the gain factor for each concentric circular light sensor element is based on the effective radius of that concentric circular light sensor element.

15. An electronic device, comprising:
    a transparent substrate;
    an opaque masking layer on the transparent substrate;
    an opening in the opaque masking layer; and
    a light sensor attached to the transparent substrate, wherein the light sensor includes a first plurality of light sensor elements located adjacent to the opening and a second plurality of light sensor elements located adjacent to the opaque masking layer, wherein the first plurality of light sensor elements are active light sensor elements and wherein the second plurality of light sensor elements are inactive light sensor elements.

16. The electronic device defined in claim 15, further comprising a display, wherein the transparent substrate comprises a cover layer for the display.

17. The electronic device defined in claim 15, further comprising:
- a plurality of amplifiers; and
- a summing circuit, wherein each amplifier is interposed between a selected one of the active light sensor elements and the summing circuit.

18. The electronic device defined in claim 17 wherein each amplifier is configured to amplify a light signal from an associated active light sensor based on the location of that active light sensor.

19. The electronic device defined in claim 18 wherein each amplifier is configured to amplify the light signal from the associated active light sensor based on a distance between that active light sensor and a center point of the opening.

20. The electronic device defined in claim 16 wherein the transparent substrate comprises glass.

* * * * *